US009150147B2

(12) United States Patent
Brush et al.

(10) Patent No.: US 9,150,147 B2
(45) Date of Patent: Oct. 6, 2015

(54) SYSTEM AND METHOD FOR CONTROLLING FEATURES

(71) Applicant: Caterpillar Inc., Peoria, IL (US)

(72) Inventors: Jeffrey A. Brush, Dunlap, IL (US); Aaron Paul Ardner, Peoria, IL (US); Daniel James Allen, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 183 days.

(21) Appl. No.: 13/790,753

(22) Filed: Mar. 8, 2013

(65) Prior Publication Data

US 2014/0258928 A1    Sep. 11, 2014

(51) Int. Cl.
| | |
|---|---|
| *G06F 3/048* | (2013.01) |
| *B60Q 1/24* | (2006.01) |
| *G06F 3/0482* | (2013.01) |
| *G06F 3/01* | (2006.01) |
| *G06F 3/0481* | (2013.01) |
| *H04N 5/445* | (2011.01) |

(52) U.S. Cl.
CPC ............... *B60Q 1/24* (2013.01); *G06F 3/0482* (2013.01); *G06F 3/0481* (2013.01); *H04N 5/44543* (2013.01)

(58) Field of Classification Search
CPC ... G06F 3/0482; G06F 3/0481; G06F 9/4443; G06F 3/04817; H04N 5/44543
USPC .......................................... 715/810, 817, 821
See application file for complete search history.

(56) References Cited

U.S. PATENT DOCUMENTS

| | | | |
|---|---|---|---|
| 5,442,527 A * | 8/1995 | Wichelt | 362/459 |
| 8,494,660 B2 * | 7/2013 | Engelen | 700/19 |
| 2004/0021689 A1 * | 2/2004 | Parker et al. | 345/771 |
| 2006/0133099 A1 * | 6/2006 | Thannikary et al. | 362/459 |
| 2007/0171087 A1 | 7/2007 | Shimazu et al. | |
| 2007/0291483 A1 * | 12/2007 | Lys | 362/227 |
| 2010/0079083 A1 | 4/2010 | Seguine | |
| 2010/0104392 A1 | 4/2010 | Bowen et al. | |
| 2011/0112691 A1 * | 5/2011 | Engelen | 700/275 |
| 2011/0282537 A1 | 11/2011 | Yamasaki et al. | |
| 2012/0242254 A1 * | 9/2012 | Kim et al. | 315/312 |
| 2013/0185662 A1 * | 7/2013 | Quattrocolo et al. | 715/764 |
| 2014/0156162 A1 * | 6/2014 | Faivre et al. | 701/84 |

FOREIGN PATENT DOCUMENTS

| | | |
|---|---|---|
| EP | 2172366 A1 | 7/2010 |
| EP | 2266833 A2 | 12/2010 |
| KR | 1020120089112 | 8/2012 |

* cited by examiner

*Primary Examiner* — Nicholas Augustine
(74) *Attorney, Agent, or Firm* — Miller, Matthias & Hull LLP

(57) ABSTRACT

A system, and related method and computer program product are disclosed. The system may comprise a lighting system including a plurality of light groups disposed on a Machine, each light group including one or more lights, a graphical user interface, and a controller. The controller may be configured to cause the graphical user interface to display a machine icon and a plurality of light icons. Each light icon may be in the shape of a light and corresponding to one of the light groups. Each light icon may be displayed proximal to the machine icon in a position generally indicative of a location on the Machine of the light group that corresponds to the light icon. In an embodiment, a light beam may be displayed generally adjacent to the first light icon to show a direction of light when the corresponding light group on the Machine is illuminated.

20 Claims, 8 Drawing Sheets

SYSTEM AND METHOD FOR CONTROLLING FEATURES

TECHNICAL FIELD

The present disclosure generally relates to control systems and, more particularly, for control systems, for features on machines in mining, earth moving, construction, and material handling applications, and the like.

BACKGROUND

Machines and vehicles (collectively, "Machines") in industrial applications may have many different features and feature systems that operators control. For example, the work lighting system is one example of a feature system that the operator may control. Work lighting may be those lights used to illuminate the Machine work area outside of the Machine.

Operator of such Machines and feature systems want clear indication of whether the features are activated and where on the Machine such features are activated. In addition care must be taken to ensure that Machine features are not accidentally activated because a gloved hand slipped on the console, touch-screen operator interface, or the like.

European Patent Application No. 2172366 published Apr. 7, 2010 (the '366 Publication) discloses a touch-screen display for programming the remote activation of work spot lights when an agricultural vehicle is not operational. The '366 Publication discloses in FIG. 4 a pictogram with illumination regions that may be selected using a key at the side of the pictogram. This type of arrangement has drawbacks because activation of the lights occurs after the vehicle is non-operational, there is no disclosed visual confirmation on the display of which spotlight has been activated, and there is no provision for determining whether the lighting request is intentional or accidental due to slippage of a finger on the input device. A better system is needed.

SUMMARY OF THE DISCLOSURE

In accordance with one aspect of the disclosure, a system is disclosed. The system may comprise a lighting system including a plurality of light groups disposed on a Machine, each light group including one or more lights, a graphical user interface, and a controller in communication with the lighting system and the graphical user interface. The controller may be configured to cause the graphical user interface to display a machine icon and a plurality of light icons. Each light icon may be in the shape of a light and corresponding to one of the light groups. Each light icon may be displayed proximal to the machine icon in a position generally indicative of a location on the Machine of the light group that corresponds to the light icon. In an embodiment, for least a first of the plurality of light icons, a light beam may be displayed generally adjacent to the first light icon to show a direction of light when the corresponding light group on the Machine is illuminated.

In accordance with another aspect of the disclosure, a method of controlling lighting on a Machine is disclosed. The method may comprise displaying on a graphical user interface, a machine icon and a plurality of light icons on a light control display. Each light icon may be in the shape of a light and corresponding to a light group disposed on the Machine at a location. Each light icon may be displayed proximal to the machine icon in a position generally indicative of the location on the Machine of the light group that corresponds to the light icon. Each of the plurality of light icons may be associated in a one-to-one correspondence with a plurality of sensory areas on the graphical user interface. The method may further comprise receiving a user input that activates a first sensory area of the plurality of sensory areas, illuminating the light group corresponding to a first light icon of the plurality of light icons, and displaying a light beam generally adjacent to the first light icon to show a direction of light of the illuminated light group. The light group may include one or more lights.

In accordance with a further aspect of the disclosure, a computer program product is disclosed. The computer program product may comprise a non-transitory computer usable medium having a computer readable program code embodied therein. The computer readable program code may be adapted to be executed to implement a method for controlling lighting on a Machine, the method comprising: displaying on a graphical user interface, a machine icon and a plurality of light icons on a light control display. Each light icon may be in the shape of a light and corresponding to a light group disposed on the Machine at a location. Each light icon may be displayed proximal to the machine icon in a position generally indicative of the location on the Machine of the light group that corresponds to the light icon. Each of the plurality of light icons may be associated in a one-to-one correspondence with a plurality of sensory areas on the graphical user interface. The method may further comprise receiving a user input that activates a first sensory area of the plurality of sensory areas, illuminating the light group corresponding to a first light icon of the plurality of light icons, and displaying a light beam generally adjacent to the first light icon to show a direction of light of the illuminated light group. The light group may include one or more lights.

DETAILED DESCRIPTION

Figure 1:
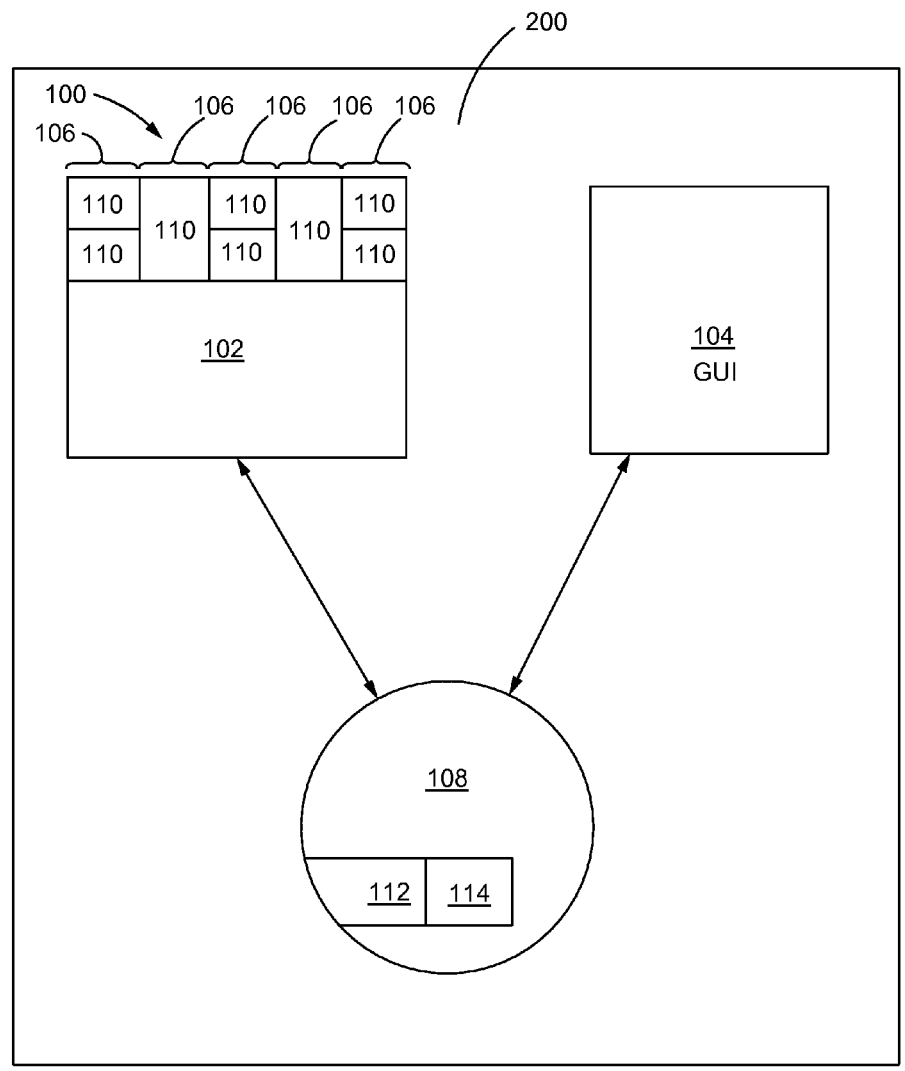
FIG. 1 is a general schematic view of an exemplary embodiment of a control system constructed in accordance with the teachings of this disclosure.

Referring now to the drawings, and with specific reference to FIG. 1, there is shown a control system in accordance with the present disclosure and generally referred to by reference numeral 100. The control system 100 comprises a feature system 102 disposed on a Machine 200 (FIG. 2), a graphical user interface (GIU) 104 (FIG. 1), and a controller 108. The control system 100, or components of it, may be disposed on the Machine (FIG. 2) or may be remote from the Machine.

Figure 2:
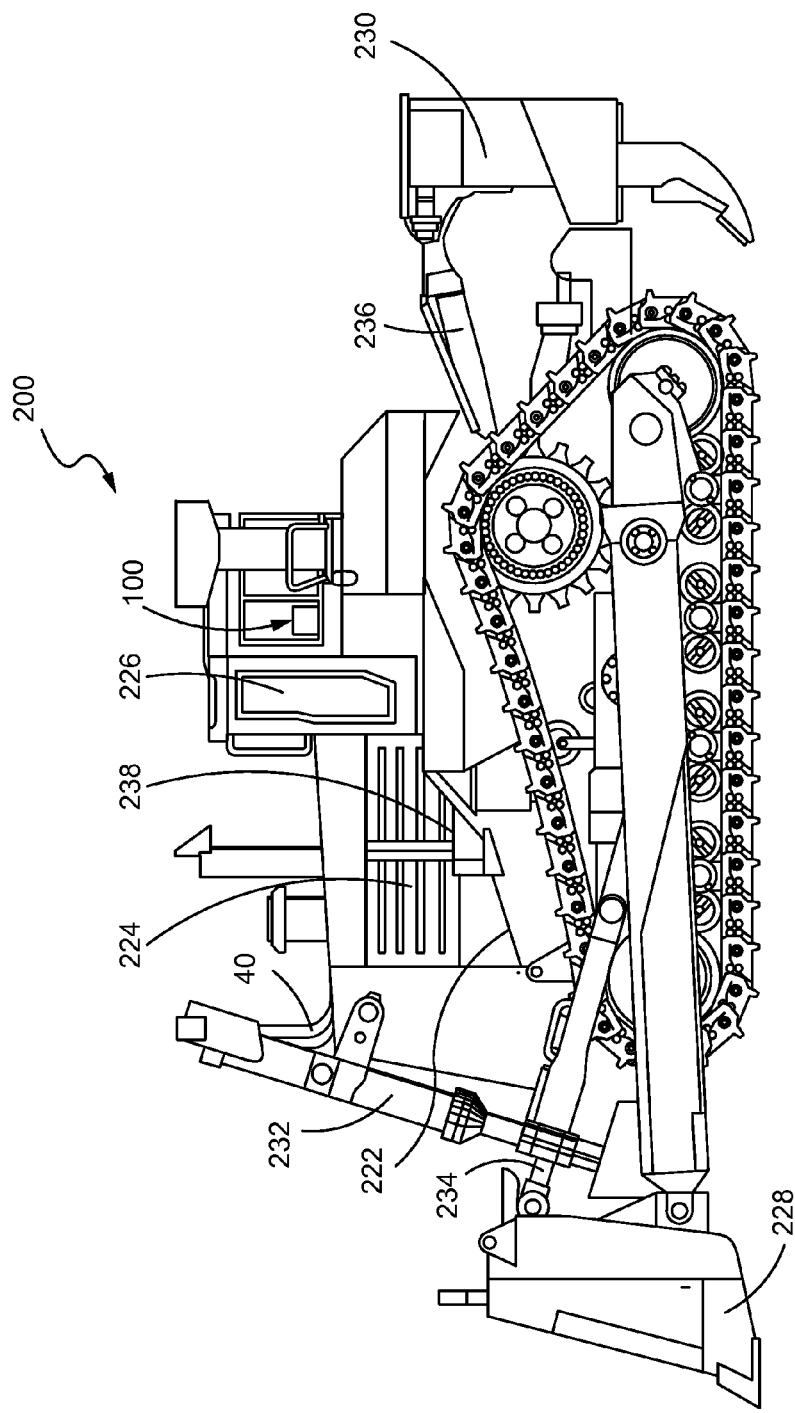
FIG. 2 is a perspective view of an embodiment of an exemplary vehicle in which a control system in accordance with the teachings of this disclosure is used.

FIG. 2 illustrates one example of a vehicle 200 that incorporates the features of the present disclosure. While the following detailed description and drawings are made with reference to the control system 100 mounted on a track type tractor 200, the teachings of this disclosure may be employed on other mining, earth moving, construction, material handling, or the like vehicles and machines.

In the illustrated embodiment, the track-type tractor 200 may include a chassis 220 supporting an engine 224. An operator cab 226 also may be supported by the chassis 222 behind the engine 224. Various tools or implements may be mounted on the tractor 200, such as, but not limited to, a blade 228 and a ripper 230. Hydraulic cylinders may be used to lift or otherwise move the tools and implements. For example, a pair of lift cylinders 232 (only one shown in FIG. 2) and a tilt cylinder 234 may be provided to manipulate the blade 228. Similarly, a ripper cylinder 236 may be provided to manipulate the ripper 230. A hydraulic pump 238 may be operatively coupled to the engine 224 to provide pressurized hydraulic fluid via hoses 240 to hydraulic cylinders 232, 234, 236.

Turning back to FIG. 1, the feature system 102 is connected to the controller 108 and may be any appropriate feature system as is known in the art for use during operation of the Machine 200. Such feature systems 102 may include, but are not limited to, lighting systems, systems that control the use and position of tools and implements disposed on a Machine, heating and cooling systems, and other operator controlled systems. For the purposes of illustrating an exemplary embodiment, the following detailed description and drawings are made with reference to a feature system 102 that is a lighting system, and more particularly a lighting system of work lights mounted on the Machine 200. However, the teachings of this disclosure may be employed with other feature systems on Machines.

In the exemplary embodiment, the lighting system 102 is mounted on the machine 200. The lighting system 102 may include a plurality of light groups 106. Each light group 106 may include one or more lights 110. In this particular embodiment, the lights 110 may be work lights. The lights 110 may be mounted on the machine 200.

The GUI 104 may be any appropriate GUI as is known in the art. For example, the GUI 104 may be a touch screen user interface configured to receive user input and to display output. The GUI may be mounted on the Machine 200 or may be remote from the Machine 200.

The controller 108 may include a processor 112 and a memory component 114. The controller 108 may be operably connected to the lighting system 102, and to the GUI 104. The processor 112 may be a microprocessor or other processor as known in the art.

The processor 112 may be configured to execute instructions and generate control signals for turning on and off the light groups 106 and for causing the GUI 104 to display a machine icon 116 (FIG. 3) and a plurality of feature icons 118 on one or more displays. Such instructions may be read into or incorporated into a computer readable medium, such as the memory component 114 or provided external to the processor 112. In alternative embodiments, hard wired circuitry may be used in place of, or in combination with, software instructions to implement a control method.

The term "computer readable medium" as used herein refers to any non-transitory medium or combination of media that participates in providing instructions to the processor 112 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 112 can read.

The controller 108 is not limited to one processor 112 and memory component 114. The controller 108 may be several processors 112 and memory components 114.

In one embodiment the controller 108 may send and receive signals from the GUI 104. Such signals may be a result of user input into the GUI 104 or Machine operational conditions. The controller 108 may send to and receive signals from the feature system 102, in this case a lighting system 102. The controller 108 may also be configured to retrieve information and data from the memory 114 and to store information and data in memory 114.

The controller 108 may be configured to cause the GUI 104 to display the machine icon 116 and a plurality of feature icons 118 on a feature control display 120. In the exemplary embodiment, the feature control display 120 is a light control display 120 from which work lights on the Machine 200 may be controlled by an operator.

Figure 3:
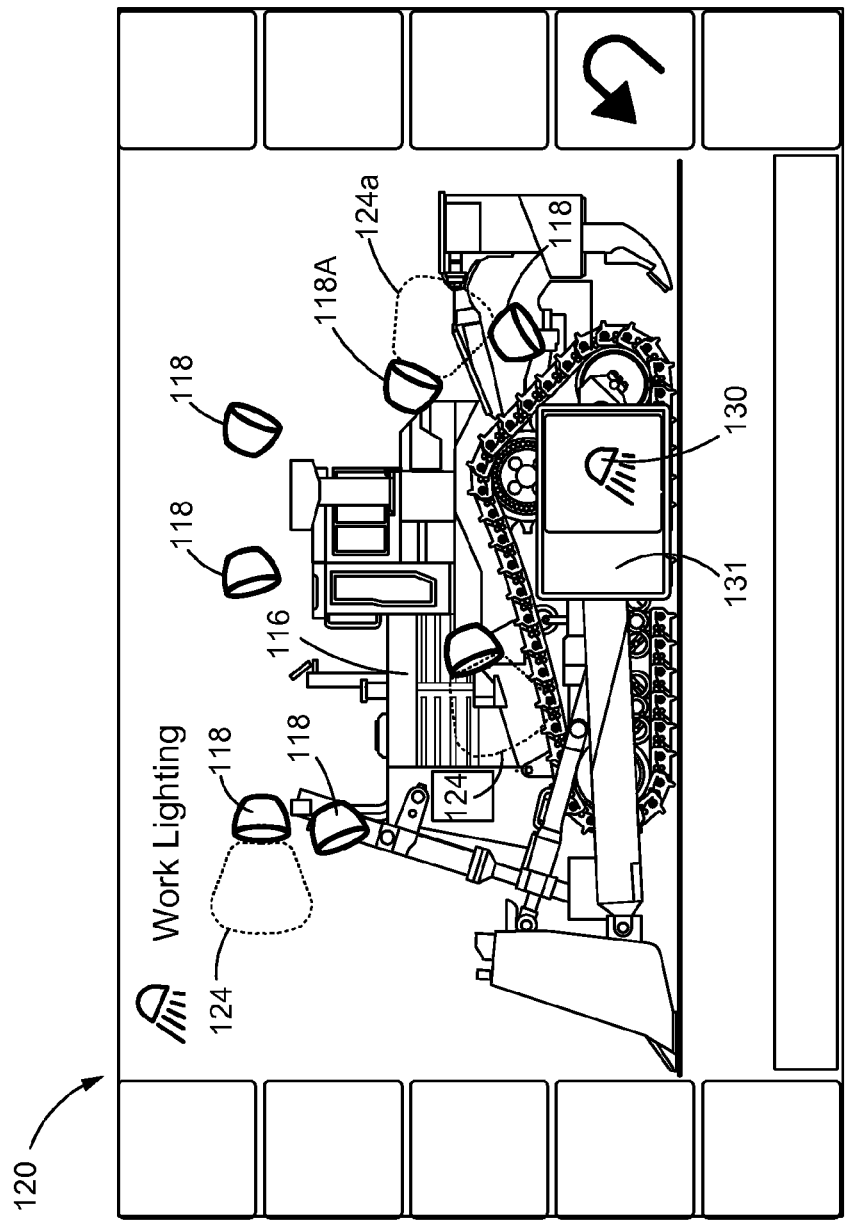
FIG. 3 is an exemplary screen shot according to an embodiment of a light control display on a graphical user interface.

FIG. 3 is a screen shot of an exemplary light control display 120. The machine icon 116 is representative of the Machine 200 and is displayed on the light control display 120. In the exemplary embodiment, the machine icon 116 represents a track-type tractor. In other embodiments, the machine icon 116 may be a wheel loader, paver, cold planer, haul truck, backhoe loader, or the like.

In the exemplary embodiment, in which the feature system 102 is a lighting system 102, the feature icons 118 may be light icons 118. In such an embodiment, each of the plurality of light icons 118 may be shaped like a light. Each of the plurality of light icons 118 corresponds to one of the light groups 106 mounted on the Machine 200. As illustrated in FIG. 3, each light icon 118 may be displayed proximal to the machine icon 116. The position of the light icon 118 in relation to the machine icon 116 is indicative of the actual location of the light group 106 (on the Machine 200) that is represented by the light icon 118. For at least one light icon 118 of the plurality of light icons 118, when the corresponding light group 106 on the Machine 200 is illuminated, a light beam 124 may be displayed generally adjacent to that light icon 118. The light beam 124 may be displayed to show the direction in which the light(s) of the light group 106 shine(s). For example, in FIG. 3, a light beam 124a is displayed adjacent to a first light icon 118a. The light beam 124a is displayed as shining in a downward direction toward the attached implement that is part of the machine icon 116.

In embodiments that utilize the light beam 124, the visibility of the light beam 124 adjacent to the light icon 118 on the light control display 120 further helps the operator to quickly determine the state of the light icon 118 and whether the corresponding light group 106 is illuminated or off. For example, if a light beam 124 is not displayed proximal to a light icon 118, the light icon 118 is not in the feature-active state and the corresponding light group 106 is not illuminated on the Machine. The presence of the light beam 124 also allows the operator to quickly ascertain in which direction the light from the illuminated light group 106 shines.

Figure 4:
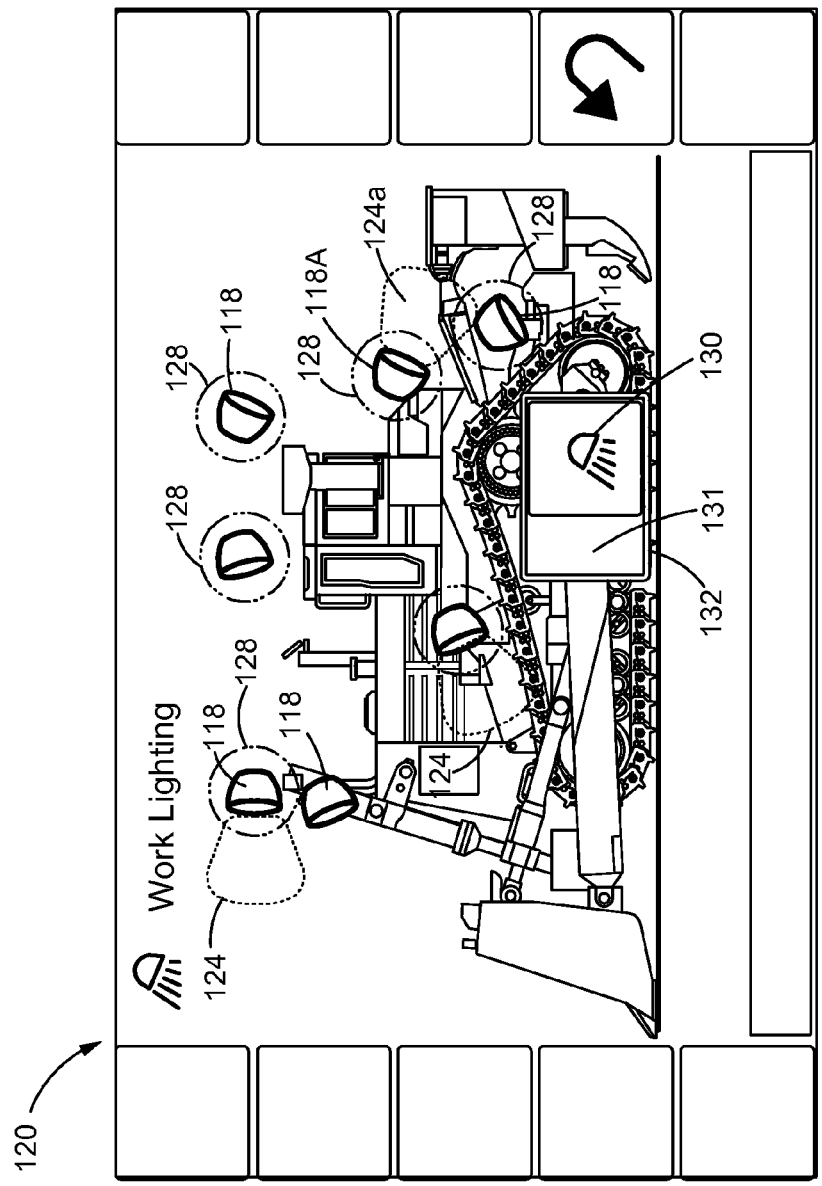
FIG. 4 illustrates the screen shot of FIG. 3 with the sensory areas visible.

The controller 108 may also be configured to associate in a one-to-one correspondence each of the plurality of light icons 118 displayed on the GUI 104 (FIG. 1) with a plurality of sensory areas 128 (FIG. 4) on the GUI 104 (FIG. 1). The sensory areas 128 (FIG. 4) may or may not be visible to the user of the GUI 104 (FIG. 1). For the purposes of illustration, sensory areas 128 may be seen on FIG. 4. FIG. 4 illustrates the light control display of FIG. 3, except that the sensory area 128 around each light icon 118 is visible. In the exemplary embodiment, the sensory area 128 is larger than the light icon 118 and the light icon 118 is positioned substantially within the perimeter of the sensory area 128. In one embodiment, the light icon 118 may be centered within the perimeter of the sensory area 128. In other embodiments, the light icons 118 may be positioned elsewhere the sensory area 128.

Each light icon 118 may have one or more states. The controller 108 (FIG. 1) may be configured to cause a light icon 118 (FIGS. 3-4) to change states when the sensory area 128 (FIG. 4) associated with the light icon 118 is activated on the GUI 104 (FIG. 1). In the exemplary embodiment, the light icon 118 (FIGS. 3-4) has four states: "ready," "contact," "in-process," and "feature-active." When the light icon 118 is in the ready state, the sensory area 128 associated with the light icon 118 is available for activation by a user. In the exemplary embodiment, the light group 106 corresponding to the light icon 118 is also not illuminated when the light icon 118 is in the ready state. When the light icon 118 is in the contact state, the sensory area 128 associated with the light icon 118 has been activated. When the light icon 118 is in the in-process state, the controller 108 is processing a user input to the sensory area 128. In the feature-activate state, feature has been activated. For example, in the exemplary embodiment where the feature system 102 is a work lighting system 102, the light group 106 corresponding to the light icon 118 is illuminated on the Machine 200 when the light icon 118 is in the feature-active state.

In one embodiment, the feature icon 118 may be displayed in different colors that distinguish between the states. For example, in the ready state the light icon 118 may be displayed as a light outlined in white. In the contact state, the light icon 118 may be displayed as a light outlined in black when the contact state is entered from the ready state. When the contact state is entered from the feature-active state, the light icon 118 may be displayed as a darker shade of the color utilized for the ready state (in one embodiment green) and the light beam may be displayed as gray. In the in-process state, the light icon 118 may be displayed in blue. In the feature-active state, the light icon 118 may be displayed in green. In other embodiments, other colors may be used to distinguish each state. As discussed previously, the display of the light beam 124 may also assist the operator in state recognition for the light icon 118. For example, in one embodiment, a light beam 124 is not displayed adjacent to the light icon 118 when the light icon 118 is in the ready state, and when the light icon 118 is in the feature-active state, the light beam 124 is displayed adjacent to the light icon 118.

In some embodiments, the controller 108 (FIG. 1) may also be configured to include a master switch icon 130 (FIGS. 3-4) on the light control display 120. Such a master switch icon 130 may associated with a master sensory area 132 (FIG. 4). The master sensory areas 132 may or may not be visible to the user of the GUI 104. For the purposes of illustration, the master sensory area 132 may be seen on FIG. 4. In one embodiment, the master sensory area 132 may be larger than the master switch icon 130 and the master switch icon 130 may be positioned substantially within the perimeter of the master sensory area 132. In one embodiment, the master switch icon 130 may be centered within the perimeter of the master sensory area 132. In other embodiments, the master switch icon 130 may be positioned elsewhere the master sensory area 132.

The result of activating the master sensory area 132 may depend on the graphical display on which the master switch icon 130 appears. In one embodiment, the controller 108 (FIG. 1) may be configured to change the operation mode of all or a group of features on the Machine 200 when the master sensory area 132 (FIG. 4) is activated on the GUI 104 (FIG. 1) when the feature control display 120 (FIGS. 3-4) is displayed. For example, the controller 108 (FIG. 1) may be configured to change the operational mode of all of the light groups 106 on the Machine 200 when the master sensory area 132 (FIG. 4) is activated on the light control display 120 displayed on the GUI 104 (FIG. 1). Changing the operational mode may encompass illuminating (or turning on) all of the light groups 106, or alternatively, turning off all of the light groups 106 on the Machine 200.

Similar to the light icons 118 (FIGS. 3-4) discussed above, each master switch icon 130 may have one or more states. The controller 108 may be configured to cause a master switch icon 130 to change states when the master sensory area 132 (FIG. 4) associated with the master switch icon 130 is activated on the GUI 104 (FIG. 1). In the exemplary embodiment, the master switch icon 130 (FIGS. 3-4) has the four previously discussed states: "ready," 'contact," "in-process," and "feature-active."

In one embodiment, the master switch icon 130 may be displayed in different colors that distinguish between the states. For example, in the ready state the master switch icon 130 may be displayed as a light shape outlined in white on a button or panel 131. In one embodiment, the master switch icon 130 may be disposed on the left side of the panel 131 when in the ready state. In the contact state, the master switch icon 130 may be displayed as a light shape outlined in black on the button or panel 131. In the in-process state, the master switch icon 130 may be displayed in blue on the button inside the panel 131. In FIGS. 3-4, the master switch icon 130 is illustrated in the feature-active state. In the feature-active state, the master switch icon 130 may be displayed in green on a button or panel 131. In one embodiment, when the master switch icon 130 changes to the feature-active state, the master switch icon 130 may slide or move to the right side of the panel 131. In some embodiments, the master switch icon 130 changes automatically to the feature-active state when at least one light icon 118 on the light control display 120 changes to the feature-active state. When the master switch icon 130 is changed from the feature-active state to the ready state, all available light icons 118 on the light control display 120 will change to the ready state and the light groups 106 corresponding to the light icons 118 will cease to be illuminated on the Machine 200.

Figure 5:
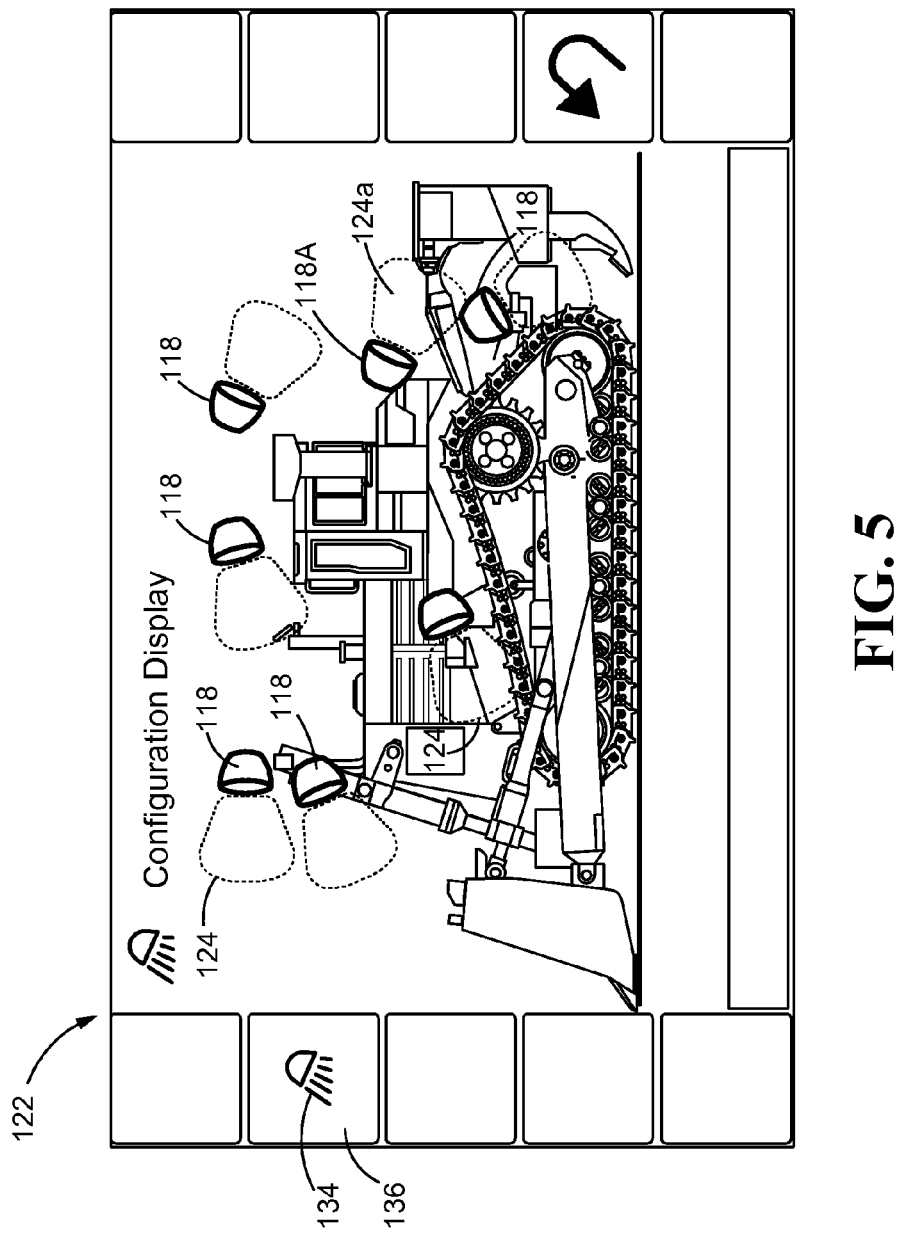
FIG. 5 is an exemplary screen shot according to an embodiment of a configuration display on a graphical user interface.

The controller 108 (FIG. 1) may also be configured to cause the GUI 104 to display the machine icon 116 and a plurality of feature icons 118 on a configuration display 122 (FIG. 5). FIG. 5 illustrates an exemplary configuration display 122. The purpose of the configuration display 122 is to allow a maintenance technician or other appropriate person to review predefined feature configurations or change the displayed feature configuration on the feature control display 120 by adding additional features or removing features on the configuration display 122. Similar to the light control display 120 discussed above, the configuration display 122 includes a machine icon 116 and a plurality of feature icons 118. In the exemplary embodiment, the feature icons 118 are light icons 118 shaped like a light. Each of the plurality of light icons 118 on the configuration display 122 corresponds to one of the light groups 106 that may be mounted on the Machine 200. In the exemplary embodiment where the feature control display 120 is a light control display, the configuration display 122 allows an appropriate user to remove light icons from the light control display 120 that correspond to light groups 106 that are not currently operational, or not installed on the Machine 200. The configuration display 122 also allows an appropriate user to add light icons to the light control display 120 that correspond to light groups 106 that are currently operational, or installed on the Machine 200.

Similar to the discussion related to the light control display 120, and as illustrated in FIG. 5, each light icon 118 may be displayed proximal to the machine icon 116. The position of the light icon 118 in relation to the machine icon 116 is indicative of the location of a light group 106 (on the Machine 200) that is represented by the light icon 118. For at least one light icon 118 of the plurality of light icons 118, when the corresponding light group 106 on the Machine 200 is illuminated, a light beam 124 may be displayed generally adjacent to that light icon 106. The light beam 124 may be displayed to show the direction in which the light(s) of the light group 106 shine(s). For example, in FIG. 5, a light beam 124a is displayed adjacent to a first light icon 118a. The light beam 124a is displayed as shining in a downward direction toward the attached implement on the machine icon 116.

In embodiments that utilize the light beam 124, the visibility of the light beam 124 adjacent to the light icon 118 on the configuration display 122 further helps the operator to quickly determine the state of the light icon 118 on the configuration display 122 and, from that, whether the light icon 118 will be displayed on the light control display 120 (and whether the corresponding light group 106 will be able to be illuminated on the Machine 200, if so desired). For example, if a light beam 124 is not displayed proximal to a light icon 118 on the configuration display 122, the light icon 118 is not in the feature-active state and the light icon 118 will not be displayed on the light control display 120. The presence of the light beam 124 also allows the operator to quickly ascertain in which direction the light from the illuminated light group 106 would shine.

Figure 6:
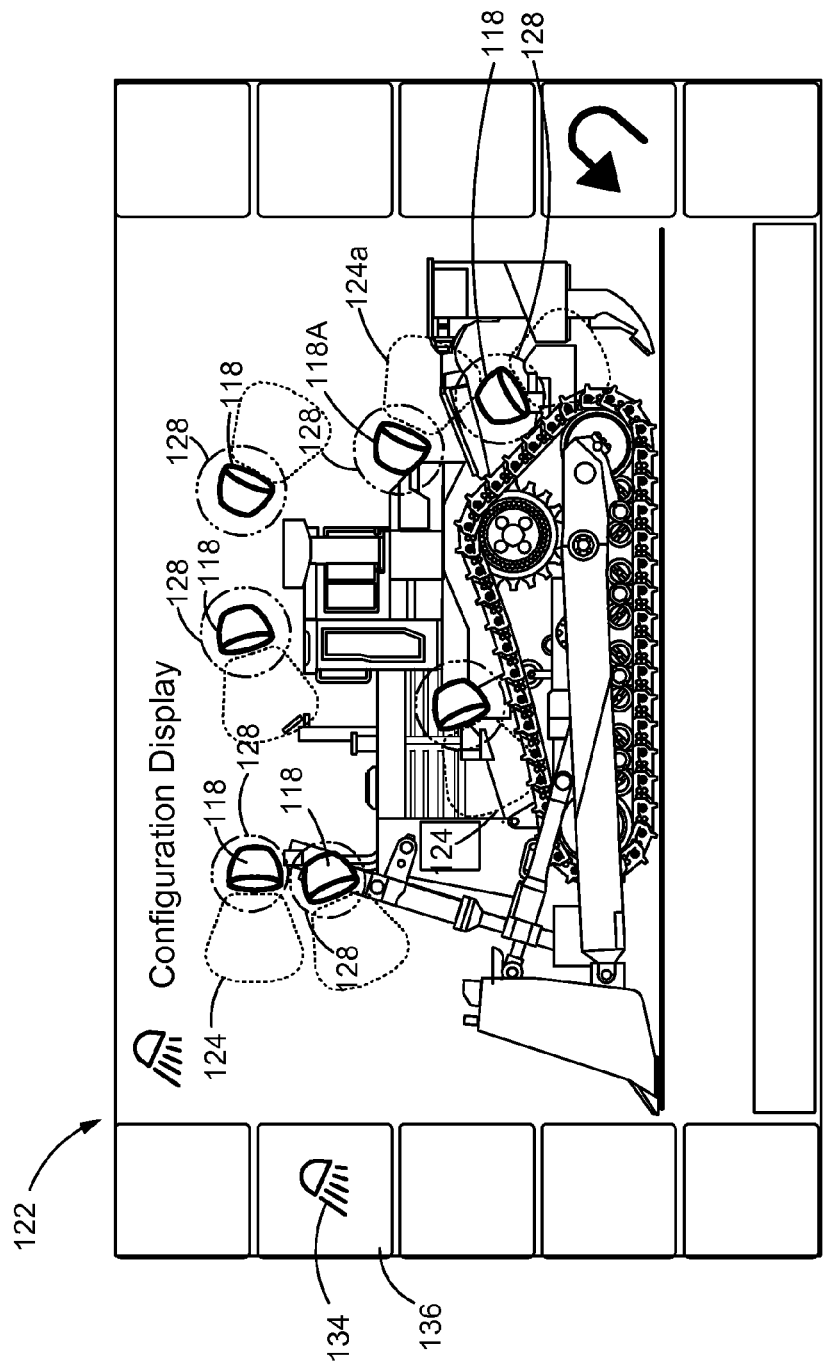
FIG. 6 illustrates the screen shot of FIG. 5 with the sensory areas visible.

The controller 108 (FIG. 1) may also be configured to associate in a one-to-one correspondence each of the plurality of light icons 118 (FIG. 6) displayed on the GUI 104 with a plurality of sensory areas 128 on the GUI 104. The sensory areas 128 may or may not be visible to the user of the GUI 104. In an exemplary embodiment, the sensory area 128 (FIG. 6) is larger than the light icon 118 and the light icon 118 is positioned substantially within the perimeter of the sensory area 128. In one embodiment, the light icon 118 on the configuration display 122 may be centered within the perimeter of the sensory area 128. In other embodiments, the light icons 118 may be positioned elsewhere in the sensory area 128.

Each light icon 118 on the configuration display 122 may have one or more states. The controller 108 may be configured to cause a light icon 118 to change states when the sensory area 128 associated with the light icon 118 is activated on the GUI 104.

In the exemplary embodiment, the light icon 118, as discussed previously, has four states: "ready," 'contact," "in-process," and "feature-active." When the light icon 118 is in the ready state, the sensory area 128 associated with the light icon 118 is available for activation by a user and, on the exemplary configuration display 122, the light icon 118 is not activated. If the light icon 118 is not illuminated on the configuration display 122, the corresponding light icon 118 will not be displayed on the light control display 120. When in the contact state, the sensory area 128 associated with the light icon 118 has been activated. When the light icon 118 is in the in-process state, the controller 108 is processing a user input to the sensory area 128. When a light icon 118 is in the feature-active state on the configuration display 122, the corresponding light icon 118 on the light control display 120 will be displayed in the ready state on the light control display. In one embodiment, the light icon 118 may be displayed in different colors that distinguish between the states. For example, in the ready state the light icon may be displayed as a light outlined in white. In the contact state, the light icon may be displayed as a light outlined in black when the state is entered from the ready state. When the contact state is entered from the feature-active state, the light icon 118 may be displayed as a darker shade of the color utilized for the ready state (in one embodiment, green) and the light beam may be displayed as gray. In the in-process state, the light icon 118 may be displayed in blue. In the feature-active state, the light icon 118 may be displayed in green. In other embodiments, other colors may be used to distinguish each state. As discussed previously, the display of the light beam 124 may also assist the operator in state recognition for the light icon 118. For example, in one embodiment, a light beam 124 is not displayed adjacent to the light icon 118 when the light icon 118 is in the ready state, and when the light icon 118 is in the feature-active state, the light beam 124 is displayed adjacent to the light icon 118.

In some embodiments, a hot button icon 134 may be displayed on the configuration display 122. A hot button sensory area 136 may be associated with the hot button icon 134. This hot button icon 134 may be shaped as a light or other symbol and may be positioned inside the perimeter of the hot button sensory area 136. The sensory area 136 may or may not be visible to the user of the GUI 104. When the hot button sensory area 136 is activated by a user, the graphical display on the GUI 104 changes from the configuration display 122 to the feature control display 120 (in this embodiment, the light control display 120.) This allows a user to add or remove light groups 106 on the configuration display 122 (by adding or removing light icons 118) and then quickly access the light control display 120 to further verify the implemented change.

Figure 7:
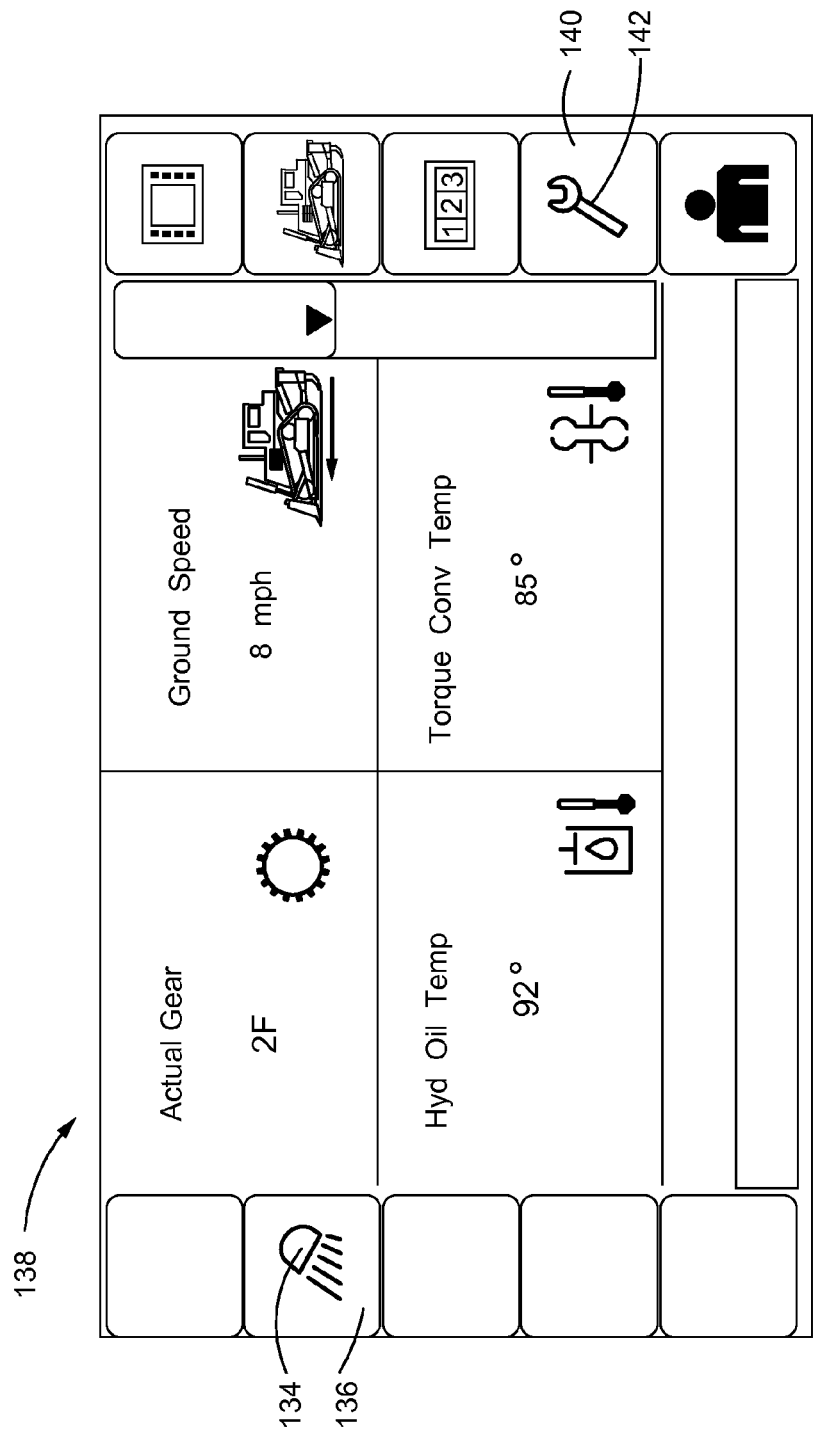
FIG. 7 is an exemplary screen shot according to an embodiment of a default graphical display on a graphical user interface, in accordance with the teachings of this disclosure.

Access may also be had to the light control display 120 from a hot button 134 on a default screen or a menu screen. For example, FIG. 7 illustrates an exemplary default graphical display 138 for the Machine 200. In the exemplary embodiment, the hot button 134 may be displayed on the side of the default display 138. In other embodiments, the hot button 134 may be displayed elsewhere on the screen. When the hot button sensory area 136 associated with the hot button icon 134 is activated, the light control display 120 is displayed.

In an embodiment, the configuration display 122 may be accessed from the default display 138 via a service menu or other menu reached when a service sensory area 140 associated with a service icon 142 is activated.

The light control display 120 and the configuration display 122 may also have other types of hot buttons. For example, in one embodiment, these displays 120, 122 may include hot buttons that when the hot button sensory area associated with such hot buttons is activated, the GUI 104 to displays the default graphical display 138. The light control display 120 and the configuration display 122 may also include a back hot button and associated sensory area. When the sensory area associated with such a hot button is activated the controller 108 may cause the GUI 104 to display the last accessed graphical display.

INDUSTRIAL APPLICABILITY

Figure 8:
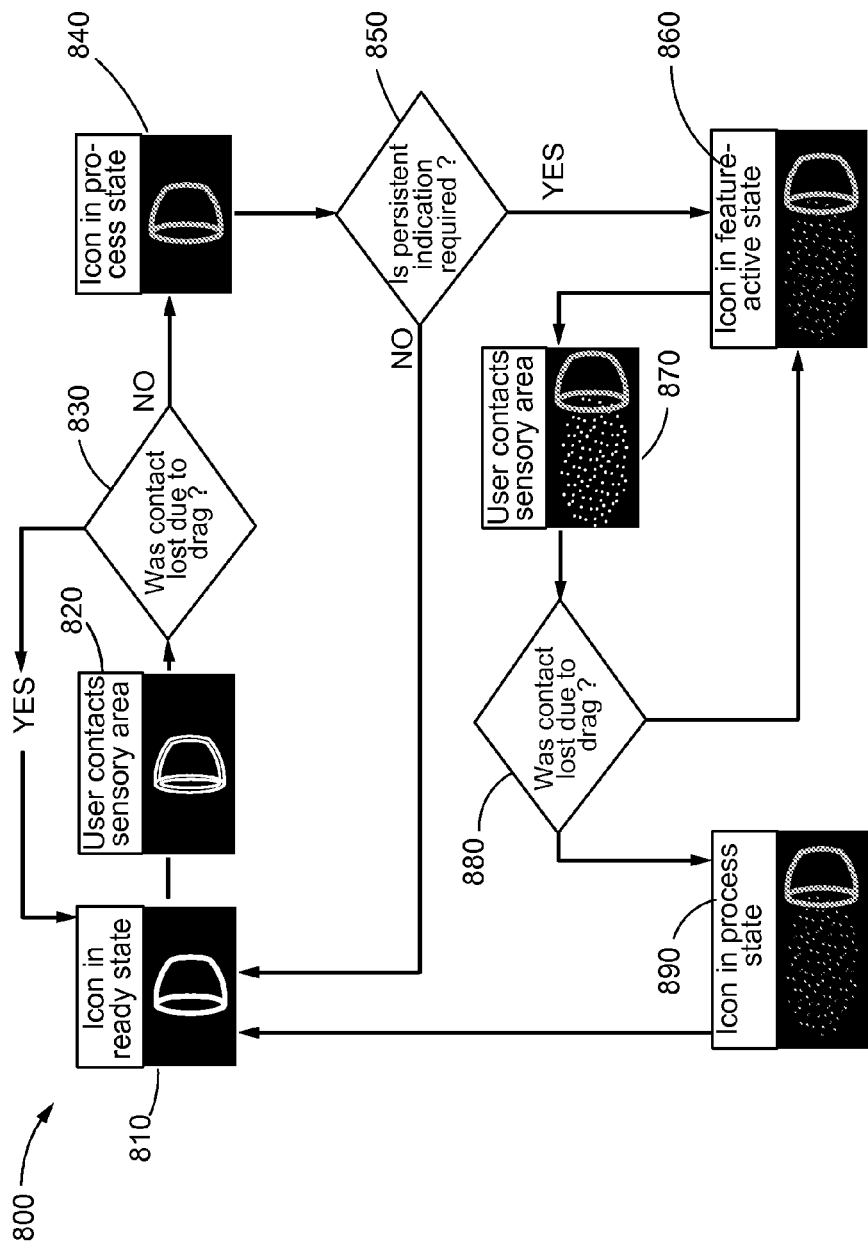
FIG. 8 is a control state diagram, in accordance with the teachings of this disclosure.

FIG. 8 illustrates an exemplary control state process 800 showing sample process blocks which may be followed in relation to activation of the sensory areas 128, 132, 136 on the GUI 104. The process 800 may be practiced with more or less than the blocks shown and is not limited to the order shown. While this control state process may be applied in relation to many different features on a Machine 200, for the purposes of illustration, it will be explained in relation to the activation of the sensory areas on the light control display 120 and on the configuration display 122. In particular, the control state process will be described in relation to the light icon 118 and the associated sensory area 128. The control state process 800 is not limited to the light icons 118 and associated sensory areas 128, but may be used with other icons displayed on the GUI 104 and their sensory areas. In other embodiments, the control state process 800 may be applied to features other than lighting on the Machine 200.

In block 810, the feature icon 118, in this case the light icon 118, is in the ready state. In one embodiment, the light icon 118 is outlined in white to help distinguish the ready state from other states. The ready state may signify different things depending on the graphical display. In one embodiment, such as when the light icon 118 appears on the light control display 120, the ready state of the light icon 118 may also signify that the light group 106 associated with the light icon 118 is available on the Machine 200 but not illuminated. In another embodiment, such as when the light icon 118 is located on the configuration display 122 of a lighting feature system 100, the ready state of the light icon 118 may signify that the light group 106 is not available (not installed, not working, or the like) on the Machine 200 and will not be displayed to the user on the light control display 120. In other applications, the ready state of the feature icon 118 may indicate that that the sensory area 128 associated with the feature icon 118 is ready to accept input from the user.

In block 820, the user contacts the (exemplary) sensory area 128 associated with the (exemplary) light icon 118 with his finger and then lifts his finger off of the sensory area 128. When the sensory area 128 of the light icon 118 in the ready state is contacted, the GUI 104 displays the light icon 118 in the contacted state. In the contacted state, the light icon 118 is displayed, in the exemplary embodiment, as outlined in black. In other embodiments, other distinguishing characteristics or colors may be used to distinguish the feature icon 118 in the contacted state from the other states.

In block 830, the controller 108 determines whether user touch or contact was lifted off the GUI 104 or dragged off (contact discontinued by the contacting member in conjunction with movement of the contacting member across the sensory area) the GUI 104. If the contact was dragged off the GUI 104, the process proceeds back to block 810 and the GUI 104 displays the feature icon 118 (light icon) in the ready state. An example of when a user's finger might be dragged off the sensory area 128 is when a user begins to touch the sensory area 128 but then his/her finger, which may be gloved, slips off of the sensory area due to error, movement of the machine, and the like. If in block 830, the controller determines that contact was lifted off, instead of dragged off, the process proceeds to block 840.

In block 840, the light icon 118 is displayed to the user in the in-process state while the controller 108 processes the requested action. Such a requested action may be, for example, if the light icon 118 is on the light control display 120, a request to illuminate the light group 106 corresponding to the light icon 118. If the light icon 118 is on the configuration display 122, the requested action may be to add a light icon 118 (representing a light group 106) to the light control display 120. In one embodiment, the light icon 118 is displayed in a color or with a characteristic that distinguishes the light icon 118 in the in-process state from when it is in other states. For example, in one embodiment, the light icon 118 may be displayed in a blue color.

In block 850, the controller 108 verifies whether a constant indication is required for the change in state of the feature icon 118 on the GUI 104. Stated another way, the controller 108 verifies whether the feature icon 118 is to remain in the feature-active state once the requested action is fulfilled or whether it is to return to the ready state. The determination may vary depending on the feature icon 118. In the illustrative example, the controller 108 is configured to keep the light icon 118 in the feature-active state on the light control display 120 when, the associated light group is illuminated on the Machine 200, and has been configured to keep the light icon 118 in the feature-active state on the configuration display 122 when the light group 106 associated with the light icon 118 has been added to the Machine 200 and the light control display 120.

If the determination is no in block 850, the requested action is completed and the light icon 118 returns to the ready state and block 810. If yes, the process proceeds to block 860.

In block 860, the feature icon 118 is displayed in the feature-active state and the feature on the Machine 200 is activated. For example, the light icon 118 is displayed in the feature-active state and the light group 106 on the Machine 200 is illuminated. In one embodiment, the light icon 118 may be displayed in a color or with a characteristic that distinguishes the light icon 118 in the feature-active state from when it is in other states. In one embodiment, the light icon 118 in the feature-active state may be displayed in a green color with a light beam 124 disposed adjacent to the light icon. The light beam 124 may be disposed to illustrate the general direction of the light of the corresponding light group 106. In one embodiment, the light beam 124 may be displayed as a translucent beam through which portions of the machine icon 116 may be visible. In another embodiment, the light beam 124 may be opaque. In yet another embodiment, the light beam may be comprised of dots, straight lines, wavy lines, diverging lines or the like, The light beam may be outlined. The light beam may be generally white, yellow, or any other appropriate color.

Often operators of Machines 200 must quickly respond to changing operation environments and conditions. For those feature icons 118 that provide constant indication, for example the light icon 118 from the exemplary embodiment discussed above, when the light icon 118 is in the feature-active state an operator can quickly determine which light group 106 on the Machine 200 is illuminated. This may be beneficial when the work areas illuminated by various light groups 106 overlap and an operator wants to ensure that he has the benefit of a particular light group 106 being illuminated on the Machine 200 during all or part of a task performed by the Machine.

For those feature icons 118 that provide constant indication, for example the light icon 118 from the exemplary embodiment discussed above, the process will proceed to block 870 when a user wants to turn the feature off and return the feature icon 118 to the ready state. For example, this may occur on the light control display 120, when the user wants to turn off the light group 106 on the Machine 200 and return the light icon 118 to the ready state. Alternatively, this may occur on the configuration display 122 when the user desires to remove a light icon 118 from the light control display 120 by changing the light icon 118 to the ready state on the configuration display 122.

In block 870, the user contacts and activates the sensory area 128 associated with the light icon 118 with his finger and then lifts his finger off the sensory area 128. When the sensory area 128 of the light icon 118 in the feature-active state is contacted by the user's finger, the GUI 104 displays the light icon 118 in the contacted state. In some embodiments, the GUI may now display the light icon in the contacted state and with the light beam 124 still displayed adjacent to the light icon 118. For example, in one embodiment, the light icon 118 may be displayed as a darker shade of green than the green color utilized for the ready state and the light beam may be displayed as gray instead of white.

In block 880, the controller 108 determines whether user touch or contact was lifted off the GUI 104 or dragged off (contact discontinued by the contacting member in conjunction with movement of the contacting member across the sensory area) the GUI 104. If the contact was dragged off the GUI 104, the process returns to block 860 and the GUI 104 displays the feature icon 118 (light icon) in the feature-active state.

If in block 880, the controller 108 determines that contact was lifted off, instead of dragged off, the process proceeds to block 890. In block 890, the light icon 118 is displayed to the user in the in-process state while the controller 108 is processing the requested action (for example, turning the light group 106 off). In some embodiments, the light beam 124 may still be displayed adjacent to the light icon 118. When the requested action is completed, for example illumination of the light group 106 ceases, the process proceeds to block 810 and light icon 118 returns to the ready state.

Also disclosed is a method of controlling lighting on a Machine 200 is disclosed. The method may comprise displaying on a GUI 104, a machine icon 116 and a plurality of light icons 118 on a light control display 120. Each light icon 118 may be in the shape of a light and corresponding to a light group 106 disposed on the Machine 200 at a location. Each light icon 118 may be displayed proximal to the machine icon 116 in a position generally indicative of the location on the Machine 200 of the light group 106 that corresponds to the light icon 118. Each of the plurality of light icons 118 may be associated in a one-to-one correspondence with a plurality of sensory areas 128 on the GUI 104. The method may further comprise receiving a user input that activates a first sensory area 128 of the plurality of sensory areas 128, illuminating the light group 106 corresponding to a first light icon 118 of the plurality of light icons 118, and displaying a light beam 124 generally adjacent to the first light icon 118 to show a direction of light of the illuminated light group 106. The light group 106 may include one or more lights 110.

The method may further comprise removing one of the light icons 118 from the light control display 120 displayed on the GUI 104 when a sensory area 128 associated with the light icon 118 on a configuration display 122 changes state.

The method may further comprise changing the operational mode of all of the light groups 106 associated with plurality of light icons 118 displayed on the light control display 120 when a master sensory area 132 associated with a master switch icon 130 is activated, wherein when the master sensory area 132 is activated.

The method may further comprise changing the state of all of the light icons 118 when the master sensory area 132 is activated. The method may further comprise changing a color on the GUI 104 of the light icon 118 when the light icon 118 changes state.

Also disclosed is a computer program product, comprising a non-transitory computer usable medium having a computer readable program code embodied therein, the computer readable program code adapted to be executed to implement a method for controlling lighting on a Machine, the method comprising displaying on a GUI 104, a machine icon 116 and a plurality of light icons 118 on a light control display 120. Each light icon 118 may be in the shape of a light and corresponding to a light group 106 disposed on the Machine 200 at a location. Each light icon 118 may be displayed proximal to the machine icon 118 in a position generally indicative of the location on the Machine 200 of the light group 106 that corresponds to the light icon 118. Each of the plurality of light icons 118 may be associated in a one-to-one correspondence with a plurality of sensory areas 128 on the GUI 104. The method may further comprise receiving a user input that activates a first sensory area 128 of the plurality of sensory areas 128, illuminating the light group 106 corresponding to a first light icon 118 of the plurality of light icons 118, and displaying a light beam 124 generally adjacent to the first light icon 118 to show a direction of light of the illuminated light group 106. The light group 106 may include one or more lights 110. In a refinement, the method may further comprise removing one of the light icons 118 from the light control display 120 displayed on the GUI 104 when a sensory area 128 associated with the light icon 118 on a configuration display 122 changes state.

Also disclosed is a system comprising a feature disposed on a Machine, a graphical user interface, and a controller in communication with the feature and the graphical user interface. The controller may be configured to cause the graphical user interface to display an icon that represents the feature. The icon may be disposed on the graphical user interface in a sensory area and may be displayed in a first of a plurality of states. The controller may be further configured to display the icon in a second state in response to contact received from a contacting member on the sensory area and then discontinued without substantial movement of the contacting member across the sensory area. The visual appearance of the icon in the first state is different than the visual appearance of the icon in the second state. In one embodiment, the contacting member may be a user's finger. The finger may be gloved. In other embodiments, the contacting member may be a tool or other instrument used to contact the sensory area.

A method of controlling a feature on a Machine is also disclosed. The method may comprise displaying on a graphical user interface an icon representing a feature on the Machine. The icon may be disposed on the graphical user interface in a sensory area and displayed in a first of a plurality of states. The method may further comprise displaying on the graphical user interface the icon in a second state in response to contact received from a contacting member on the sensory area and then discontinued without substantial movement of the contacting member across the sensory area. The visual appearance of the icon in the first state is different than the visual appearance of the icon in the second state.

The features disclosed herein may be particularly beneficial for use with mining, earth moving, construction or material handling vehicles.

What is claimed is:

1. A system comprising:
   a lighting system including a plurality of light groups disposed on a Machine, each light group including one or more lights;
   a graphical user interface; and
   a controller in communication with the lighting system and the graphical user interface, the controller configured to cause the graphical user interface to display a machine icon and a plurality of light icons, each light icon in the shape of a light and corresponding to one of the light groups, each light icon displayed proximal to the machine icon in a position generally indicative of a location on the Machine of the light group that corresponds to the light icon, the controller further configured to associate in a one-to-one correspondence each of the plurality of light icons displayed on the graphical user interface with a plurality of sensory areas on the graphical user interface and to cause a first light icon of the plurality of light icons to change from a first state to a second state when a first sensory area associated with the first light icon is activated by a user contact, and to return the first light icon to the first state if the user contact was dragged off of the first sensory area;

wherein for at least the first of the plurality of light icons, a light beam is displayed generally adjacent to the first light icon to show a direction of light when the corresponding light group on the Machine is illuminated.

2. The system of claim 1, wherein the graphical user interface is a touch screen.

3. The system of claim 1, wherein the machine icon is shaped as a track-type tractor.

4. The system of claim 1, in which the controller is configured to cause the graphical user interface to display each light icon inside the perimeter of the corresponding sensory area.

5. The system of claim 4, wherein the controller is configured to cause a second light icon of the plurality of light icons to change state when a second sensory area associated with the second light icon is activated by a user.

6. The system of claim 5, wherein when the first light icon changes state, at least a portion of the first light icon changes color.

7. The system of claim 1, wherein activation of the first sensory area associated with the first light icon causes the light group corresponding to the first light icon to be illuminated, unless the user contact was dragged off the first sensory area.

8. The system of claim 5, wherein activation of the first sensory area associated with the first light icon causes the light group corresponding to the first light icon to cease being illuminated.

9. The system of claim 5, wherein each light icon has four states.

10. The system of claim 5, in which the controller is configured to display on the graphical user interface a master switch icon and to associate a master sensory area with the master switch icon, the controller is further configured to cause all of the light groups on the machine to change operational mode when the master sensory area is activated.

11. The system of claim 4, wherein the machine icon and the light icons are part of a configuration display displayed on the graphical user interface, and when a first sensory area is activated by a user input, the first light icon changes state on the configuration display.

12. The system of claim 11, in which the controller is configured to remove the first light icon from a light control display that is subsequently displayed on the graphical user interface after the graphical user interface receives user input to the configuration display that causes the first light icon to change to a ready state.

13. A method of controlling lighting on a Machine, the method comprising:

displaying on a graphical user interface, a machine icon and a plurality of light icons on a light control display, each light icon in the shape of a light and corresponding to a light group disposed on the Machine at a location, each light icon displayed proximal to the machine icon in a position generally indicative of the location on the Machine of the light group that corresponds to the light icon, each of the plurality of light icons associated in a one-to-one correspondence with a plurality of sensory areas on the graphical user interface;

receiving a user input on a first sensory area that activates the first sensory area of the plurality of sensory areas;

changing a first light icon of the plurality of icons from a first state to a second state when the user input is received;

unless the user input was dragged off the first sensory area, illuminating the light group corresponding to the first light icon of the plurality of light icons and displaying a light beam generally adjacent to the first light icon to show a direction of light of the illuminated light group; and if the user input was dragged off the first sensory area, returning the first light icon to the first state without illuminating the light group corresponding to the first light icon;

wherein the light group includes one or more lights.

14. The method of claim 13, further comprising removing the first light icon from the light control display after the first sensory area corresponding to the first light icon changes state on a configuration display.

15. The method of claim 13, further comprising changing the operational mode of all of the light groups associated with the plurality of light icons displayed on the light control display when a master sensory area associated with a master switch icon is activated.

16. The method of claim 15, further comprising changing the state of all of the light icons when the master sensory area is activated.

17. The method of claim 13, further comprising changing a color of the light icon when the light icon changes state.

18. The method of claim 13, wherein each light icon has four states.

19. A computer program product comprising a non-transitory computer usable medium having a computer readable program code embodied therein, the computer readable program code adapted to be executed to implement a method for controlling lighting on a Machine, the method comprising:

displaying on a graphical user interface, a machine icon and a plurality of light icons on a light control display, each light icon in the shape of a light and corresponding to a light group disposed on the Machine at a location, each light icon displayed proximal to the machine icon in a position generally indicative of the location on the Machine of the light group that corresponds to the light icon, each of the plurality of light icons associated in a one-to-one correspondence with a plurality of sensory areas on the graphical user interface;

receiving a user input on a first sensory area that activates the first sensory area of the plurality of sensory areas;

changing a first light icon of the plurality of icons from a first state to a second state when the user input is received;

unless the user input was dragged off the first sensory area, illuminating the light group corresponding to the first light icon of the plurality of light icons and displaying a light beam generally adjacent to the first light icon to show a direction of light of the illuminated light group; and if the user input was dragged off the first sensory area, returning the first light icon to the first state without illuminating the light group corresponding to the first light icon, wherein the light group includes one or more lights.

20. The computer program product of claim 19, in which the method further comprises removing one of the light icons from the light control display displayed on the graphical user interface when a sensory area associated with the light icon on a configuration display changes state.

* * * * *